(12) United States Patent
Giesseler (10) Patent No.: US 8,878,699 B2
(45) Date of Patent: Nov. 4, 2014

(54) METHOD FOR PROVIDING A PILOT WARNING SIGNAL FOR A PILOT OF AN AIRCRAFT, COMPUTER PROGRAM PRODUCT AND WARNING DEVICE

(75) Inventor: Hans-Gerd Giesseler, Halstenbek (DE)

(73) Assignee: Airbus Operations GmbH, Hamburg (DE)

( * ) Notice: Subject to any disclaimer, the term of this patent is extended or adjusted under 35 U.S.C. 154(b) by 810 days.

(21) Appl. No.: 13/094,465

(22) Filed: Apr. 26, 2011

(65) Prior Publication Data

US 2011/0273314 A1 Nov. 10, 2011

Related U.S. Application Data

(63) Continuation of application No. PCT/EP2010/060645, filed on Jul. 22, 2010.

(60) Provisional application No. 61/227,885, filed on Jul. 23, 2009.

(30) Foreign Application Priority Data

Jul. 23, 2009 (DE) .......................... 10 2009 027 979

(51) Int. Cl.
*G08B 21/00* (2006.01)
*G05D 1/08* (2006.01)

(52) U.S. Cl.
CPC .................................. *G05D 1/0825* (2013.01)
USPC ........... 340/945; 340/963; 340/965; 340/975; 340/407.1; 200/61.89; 244/221; 244/235

(58) Field of Classification Search
None
See application file for complete search history.

(56) References Cited

U.S. PATENT DOCUMENTS

| 3,979,717 | A | * | 9/1976 | Barnum et al. | ................ 340/946 |
| 4,083,235 | A | * | 4/1978 | Gallant | ....................... 73/112.06 |
| 4,745,053 | A | * | 5/1988 | Mitsuhashi | ....................... 435/5 |
| 5,590,853 | A | * | 1/1997 | Greene | ......................... 244/184 |

(Continued)

FOREIGN PATENT DOCUMENTS

| CN | 101176133 | 5/2008 |
| CN | 101381002 | 3/2009 |
| CN | 101410295 | 4/2009 |
| EP | 0 262 702 | 4/1988 |

(Continued)

OTHER PUBLICATIONS

International Search Report for PCT Application No. PCT/EP2010/060645 dated Nov. 2, 2010.

*Primary Examiner* — Curtis King
(74) *Attorney, Agent, or Firm* — Jenkins, Wilson, Taylor & Hunt, P.A.

(57) ABSTRACT

A method and device for providing a pilot warning signal is provided, where such method can include providing a first signal to indicate a pedal angle of a pedal, providing a second signal which is directly dynamically dependent on the pedal angle, pairing up values of the first signal and the second signal at specific times, determining an angle change of the pairs of values and an increment of the pairs of values at two successive times, and generating the pilot warning signal when actuation of the pedal and a stimulated tumbling movement of the aircraft are ascertained and if the determined angle change of the pairs of values is greater than a first threshold value or the determined angle change of the increment of the pairs of values is greater than a second threshold value. A computer program product and a warning device are also provided.

18 Claims, 6 Drawing Sheets

(56) References Cited

U.S. PATENT DOCUMENTS 5,889,491 A * 3/1999 Minter .................... 342/174
6,002,349 A    12/1999 Greene et al.
8,108,098 B2 * 1/2012 Childress et al. ............... 701/36

FOREIGN PATENT DOCUMENTS

| EP | 0 742 142 | 11/1996 |
| EP | 0 742 508 | 11/1996 |
| JP | 10-167191 | 6/1998 |

* cited by examiner

METHOD FOR PROVIDING A PILOT WARNING SIGNAL FOR A PILOT OF AN AIRCRAFT, COMPUTER PROGRAM PRODUCT AND WARNING DEVICE

CROSS-REFERENCE TO RELATED APPLICATIONS

This application is a continuation of and claims priority to PCT International Application No. PCT/EP2010/060645 filed Jul. 22, 2010, which claims the benefit of and priority to German Patent Application No. 10 2009 027 979.2, filed Jul. 23, 2009, and U.S. Provisional Application No. 61/227,885 filed Jul. 23, 2009, the entire disclosures of which are herein incorporated by reference.

FIELD OF THE INVENTION

The present invention relates to a method for providing a pilot warning signal for a pilot of an aircraft. The present invention further relates to a computer program product and a warning device.

Although it can be applied in any sector, the present invention is described in more detail in relation to an aircraft or a passenger aircraft.

BACKGROUND OF THE INVENTION

The technical field of the invention relates to warning a pilot when a control member of the aircraft, in particular a pedal for controlling the rudder(s) of the aircraft, is actuated improperly.

If the pilot of the aircraft applies doublets, in particular repeated doublets, as a pedal input, the lateral degrees of freedom of yaw, roll and sideslip are stimulated and this can lead to stimulation of the tumbling movement of the aircraft via the rudder.

If this stimulation occurs at the natural frequency of the tumbling movement (Dutch roll mode), strong responses occur in the aircraft structure owing to resonance. The damping of the tumbling movement is conventionally improved (increased) through the effect of the flight control system, in particular the yaw damper.

The above-mentioned response is intensified further if, in addition, the yaw damper authority of the flight control system can be limited. As a result of the residual low damping, this leads to an intensified lateral response in terms of flight mechanics. Consequently, correspondingly high loading on the aircraft components, for example on the rudder unit, can occur.

The problem of increased aircraft response is conventionally attenuated by increased yaw damping by means of the rudder, provided that the yaw damper still has authority. However, this measure is ineffective if the yaw damping effect is limited.

The alternative would be to increase yaw damping by the roll control surfaces on the wings of the aircraft.

However, this measure is ineffective, since the yaw damping effect of the roll control surfaces is small. These alternatives are also subject to narrow limits owing to practical operating aspects.

A further alternative for increasing yaw damping authority disadvantageously involves additional hardware for the mechanical signal transmission from the pedal to the rudder of the aircraft and thus increased costs and additional weight.

SUMMARY OF THE INVENTION

It is thus an object of the present invention to provide a warning for the pilot which overcomes the above-mentioned drawbacks.

This object is achieved according to the invention by a method having the features of claim 1, by a computer program product having the features of claim 10 and by a warning device having the features of claim 11.

Accordingly, a method for providing a pilot warning signal for a pilot of an aircraft is proposed, which method comprises the following steps:
a) providing a first signal to indicate a pedal angle of a pedal which can be actuated by the pilot;
b) providing a second signal which is directly dynamically dependent on the pedal angle;
c) in each case, forming a pair of values from the first signal and the second signal at a specific time;
d) in each case, determining an angle change of the pairs of values and an angle change of the increment of the pairs of values at two successive times; and
e) generating the pilot warning signal when actuation of the pedal and a stimulated tumbling movement of the aircraft are ascertained and if the determined angle change of the pairs of values is greater than a first threshold value or the determined angle change of the increment of the pairs of values is greater than a second threshold value.

A computer program product is also proposed which causes a method as described above to be carried out on a program-controlled apparatus.

A warning device for providing a pilot warning signal intended for a pilot of an aircraft is also provided, in particular using a method according to the invention, comprising a first apparatus which is set up to provide a first signal which contains information about a pedal angle of a pedal which is can be actuated by the pilot; comprising a second apparatus which is set up to provide a second signal which is directly dynamically dependent on the pedal angle; comprising a third apparatus which is set up to form a respective pair of values from the first and second signals at a predetermined time; comprising a fourth apparatus which is set up to determine, in each case, an angle change of the pairs of angles and an angle change of the increment of the pairs of angles at two successive times; and comprising a fifth apparatus which is set up to generate the pilot warning signal when actuation of the pedal and a stimulated tumbling movement of the aircraft are ascertained and if the predetermined angle change of the pairs of values is greater than a first threshold value or the predetermined angle change of the increment of the pairs of values is greater than a second threshold value.

A computer program product such as a computer program apparatus can be provided or supplied as, for example, a memory medium, such as a memory card, USB stick, floppy disc, CD-ROM, DVD, hard disk or else in the form of a downloadable data file from a server in a network. This can take place, for example, in a wireless communications network by transmitting a corresponding data file using the computer program product or the computer program apparatus.

The respective apparatus, i.e. the first, second, third, fourth and/or fifth apparatus, is preferably implemented using hardware technology, but the functionality thereof could also be implemented using software technology. In the case of implementation using hardware technology, the respective apparatus can be formed as a device, for example as a computer, microprocessor, program-controlled apparatus, or else as part of a system, for example as a computer system. In the case of implementation using software technology, the respective apparatus can be formed as a computer program product, as a function, as a routine, as part of a program code or as an object which can be designed.

Assuming in principle that the pilot of the aircraft wants to damp the tumbling movement over the long term, a problem only arises if the pilot actuates the pedals out of phase.

An advantage of the present invention is that in such a case a pilot warning signal to signal the pilot's misjudgment with respect to the phase relationship of the pedals for moving the aircraft is issued to the pilot. The pilot warned by the pilot warning signal can correct his mistake and carry out appropriate pedal operations or dispense with pedal operations.

Overall, the proposed solution is a very cost-effective option for preventing stimulation—not intended but nevertheless caused by the pilot—of the tumbling movement and the resulting consequences in terms of loading.

Advantageous embodiments and improvements of the invention can be found in the dependent claims.

According to a preferred development, the second signal is formed as a sideslip angle signal to indicate a sideslip angle of the aircraft, as a lateral load factor of the aircraft or as a rotation rate of the aircraft about the vertical axis of the aircraft.

According to a further preferred development, the second signal is formed as a reconstructed sideslip angle signal of the aircraft.

According to a further preferred development, the respective angle change is determined by means of complex arithmetic or by means of a polar curve.

According to a further preferred development, the second signal is formed as a negative rotation rate about the vertical axis (negative body yaw rate).

The first and second signals are preferably low-pass filtered for smoothing.

According to a further preferred development, the following steps for ascertaining the actuation of the pedal are provided to avoid false alarms:
  determining a first temporal derivative of the pedal angle of the provided first signal to provide a pedal speed; and
  estimating a relevant actuation of the pedal as a function of the provided first signal and the determined first temporal derivative to provide a first logic actuation signal.

According to a further preferred development, the following steps for ascertaining the actuation of the pedal are provided to avoid false alarms:
  providing a non-critical range for the pedal angle of the pedal which can be actuated by the pilot;
  determining an upper critical range above the non-critical range;
  determining a lower critical range below the non-critical range;
  detecting entry into an (upper or lower) critical range with subsequent prompt transition into the opposing critical range;
  setting a second logic actuation signal to a positive logic signal level when a transition is detected.

According to a further preferred development, the pilot warning signal is generated if the first and second logic actuation signals are set to a logic signal level and if the determined angle change of the first pair of values is greater than a first threshold value or the angle change of the pair of increment values is greater than a second threshold value.

According to a further preferred development, the first signal is provided by means of a measurement of the pedal angle.

According to a further preferred development, the first signal is calculated as a function of a measured rudder deflection and a yaw damping signal.

According to a further possible development, the rudder angle is selected as a first signal, as a result of which an effect on the aircraft of the sum of the pedal actuation by the pilot and the yaw damping signal is evaluated.

According to a further preferred development, the first signal and the second signal are sampled at specific times. The pairs of values are mapped from the sampled first signal and the sampled second signal as a complex number with the first signal as a real part and the second signal as an imaginary part, the ratio of the relative changes in the first and second signals of two pairs of values at two successive times being mapped as a change in the phase angle of the complex number.

According to a further preferred development, a first logic tumbling movement signal is set to a positive logic signal level to indicate a significant stimulated tumbling movement of the aircraft if the value of the complex number (formed in this case for example from a filtered and normalised roll and yaw rate) exceeds a threshold value.

According to a further preferred development, the pilot warning signal is generated if the first logic tumbling movement signal is set to a positive logic signal level and if the first and second logic actuation signals are set to a positive logic signal level.

According to a further preferred development, a second logic tumbling movement signal is set to a positive logic signal level to indicate a tumbling movement of the aircraft if the first logic tumbling movement signal has been set to a logic signal level for a first predetermined duration and this signal level is maintained further. It is set to a non-positive logic signal level if the third logic tumbling movement signal has been set to a non-positive logic signal level for a second predetermined duration and this signal level is maintained.

According to a further preferred development, the pilot warning signal is generated if the second logic tumbling movement signal is set to a positive logic signal level and if the first and second logic actuation signals are set to a positive logic signal level.

According to a further preferred development, the first apparatus comprises a potentiometric, inductive, capacitive and/or optical angle sensor which is set up to detect and make available the angle of a pedal which can be actuated by the pilot. It would also be conceivable for the first apparatus to comprise a potentiometric, inductive, capacitive and/or optical linear converter which is set up to detect and make available a linear movement which represents the position of a pedal actuated by the pilot.

According to a further preferred development, the second apparatus comprises a measuring apparatus which detects a negative rotation rate of the aircraft about the vertical axis thereof by direct measurement and derives the second signal from said negative rotation rate.

According to a further preferred development, a program-controlled apparatus, in particular a microcontroller or microprocessor, is provided which contains at least one of the first to fifth apparatuses and preferably all of the first to fifth apparatuses.

According to a further preferred development, the program-controlled apparatus is set up to calculate the first signal (x) from a detected rudder angle and/or detected yaw damping. It would also be conceivable for the program-controlled apparatus to be formed to determine the second signal (y) by arithmetic using complex numbers or by a polar curve.

According to a further preferred development, the program-controlled apparatus is set up to form the pair of values (x, y) and a memory is provided in which at least one pair of values (x, y) at a first time (k−1) and at least one increment of the pair of values (x, y) at the first time (k−1) can be stored, and the program-controlled apparatus is set up to determine the angle change (V) from the pair of values (x, y) at the first time (k−1) and the pair of values (x, y) at a second time (k) and to determine the angle change (I) of the increment from the increment of the pair of values (x, y) at the first time (k−1) and the increment of the pair of values (x, y) at the second time (k).

According to a further preferred development, the fifth apparatus comprises an optical warning apparatus formed as a signal light or monitor or an acoustic warning apparatus formed as a loudspeaker or a haptic warning apparatus formed as a device for producing a vibration.

According to a further preferred development, the fifth apparatus comprises any desired combination of an optical warning apparatus, an acoustic warning apparatus and a haptic warning apparatus.

BRIEF DESCRIPTION OF THE INVENTION

In the following, the invention is described in detail on the basis of embodiments with reference to the accompanying figures, in which.

In the figures, like reference numerals denote like or functionally equivalent components, unless indicated otherwise.

DETAILED DESCRIPTION OF THE INVENTION

Figure 1:
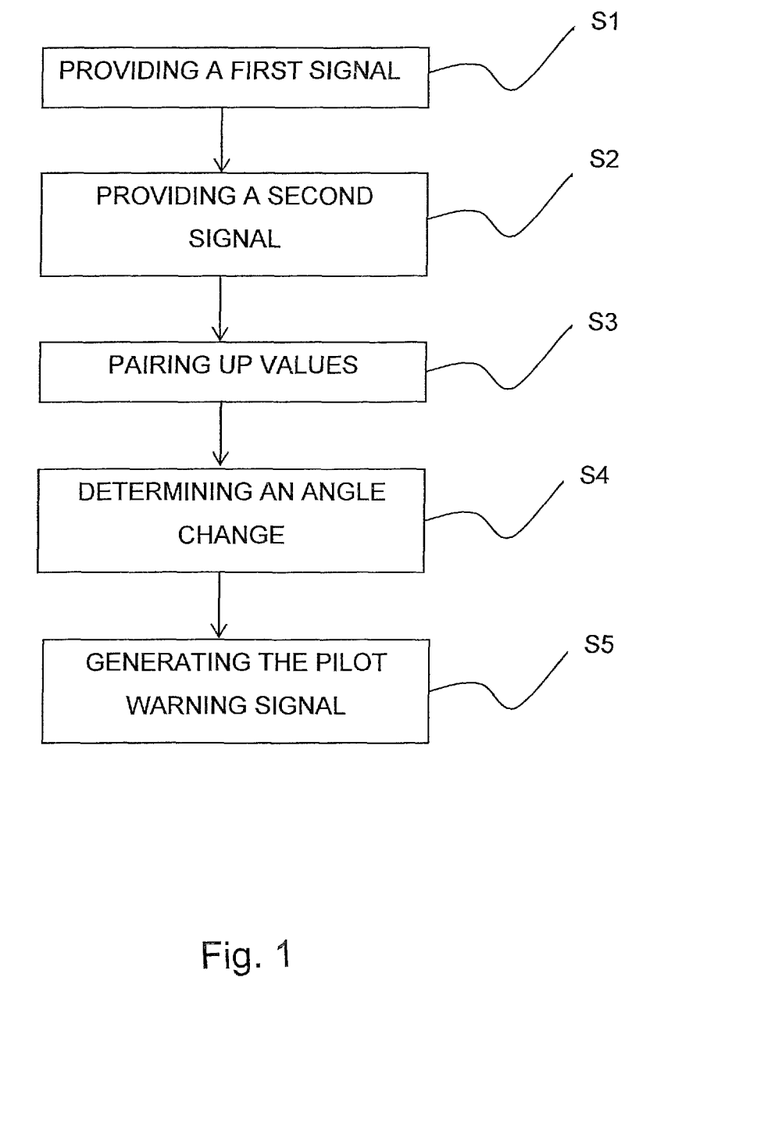
FIG. 1 is a flow diagram of an embodiment of a method for providing a pilot warning signal.

FIG. 1 is a schematic flow diagram of an embodiment of a method for providing a pilot warning signal P.

In the following, the method according to the invention is described in detail on the basis of the block diagram in FIG. 1 with reference to FIGS. 2, 3 and 4. The embodiment of the method according to FIG. 1 comprises the following method steps S1 to S5:

Method Step S1:

A first signal x is provided indicating a pedal angle of a pedal which can be actuated by the pilot.

The first signal x is preferably provided by means of a measurement of the pedal angle. Alternatively, the first signal x can be calculated as a function of a measured rudder deflection and a yaw damping signal. It is also possible to use the rudder deflection directly. In this case, the information which the system supplies is based on the sum of the effect of the yaw damper and actuation of the pedal by the pilot.

Method Step S2:

A second signal y is provided which is directly dynamically dependent on the pedal angle. Direct dynamic dependence means that a change in the pedal angle has a direct and immediate effect on the value of the second signal y.

The second signal y is formed, for example, as a sideslip angle signal indicating a sideslip angle of the aircraft, as a lateral load factor of the aircraft or as a negative rotation rate about the vertical axis of the aircraft.

The second signal y can also be formed as a reconstructed sideslip angle signal of the aircraft.

In contrast to the measured sideslip angle, the reconstructed sideslip angle does not include the direct effect of a gust on the aircraft.

Method Step S3:

At each specific time k, for example at each sampling time k of the two signals x and y, a respective pair of values x, y, in particular x(k), y(k), is formed from the first signal x and the second signal y.

Method Step S4:

At two successive times k−1, k, an angle change V of the pairs of values x, y and an angle change I of the increment of the pairs of values x, y is determined in each case.

Figure 2:
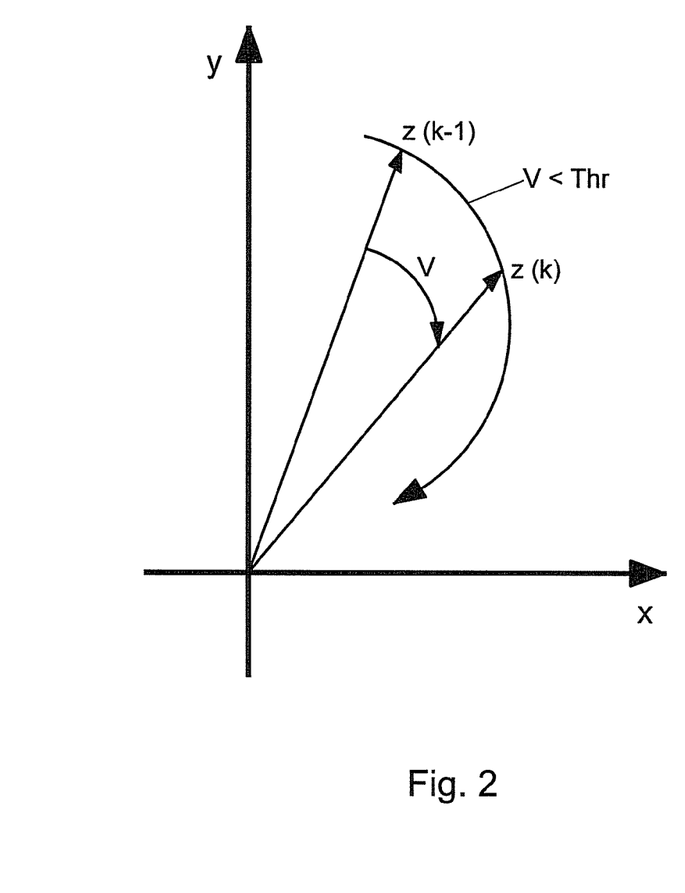
FIG. 2 is a schematic diagram showing an angle change of the pairs of values at two successive times in the case of damping of a tumbling movement of the aircraft.
Figure 3:
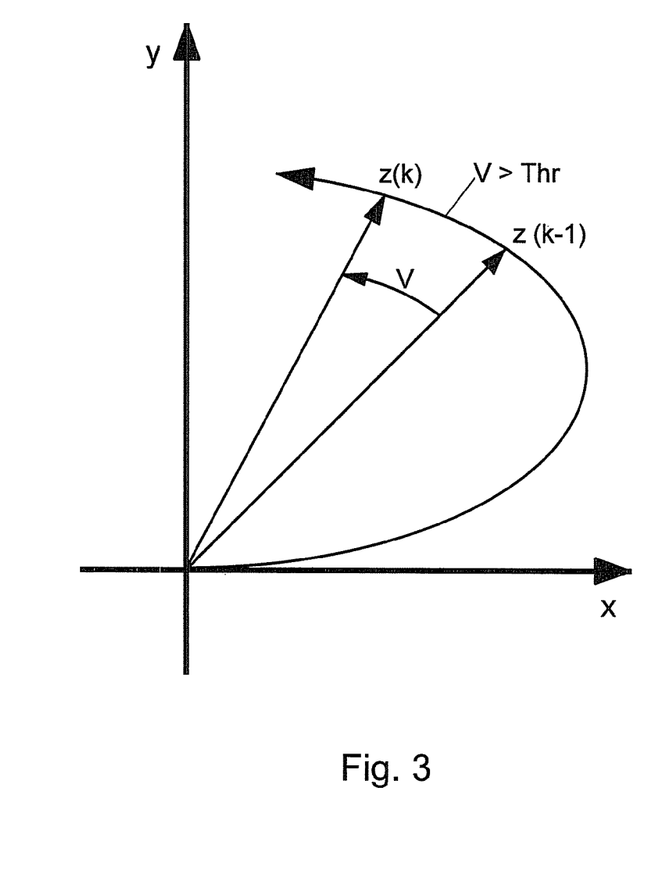
FIG. 3 is a schematic diagram showing an angle change of the pairs of values at two successive times in the case of stimulation of a tumbling movement of the aircraft.

In this regard, FIG. 2 is a schematic diagram showing an angle change V of the pairs of values x, y at two successive times k−1, k in the case of damping of a tumbling movement of the aircraft. In contrast, FIG. 3 is a schematic diagram showing an angle change V of the pairs of values x, y at two successive times k−1, k in the case of stimulation of a tumbling movement of the aircraft.

A point z of k is determined by:

$$z(k)=z(x(k),y(k))=x(k)+iy(k)$$

According to FIG. 2, damping of the tumbling movement occurs when V<Thr. Consequently, stimulation of the tumbling movement of the aircraft according to FIG. 3 occurs when V>Thr.

[i.e. V is the angle of the change k−1→k in z2]

Method Step S5:

The pilot warning signal P is generated when an actuation B of the pedal and a stimulated tumbling movement T of the aircraft are ascertained and if the determined angle change V of the pairs of values x, y is greater than a first threshold value TH1 or the determined angle change I of the increment of the pairs of values x, y is greater than a second threshold value TH2.

As a result of the generated pilot warning signal P, an acoustic, optical and/or mechanical output for the pilot is provided and output in order to warn said pilot. The pilot warning signal P can also be used to bring about a reconfiguration of the flight control system.

Figure 4:
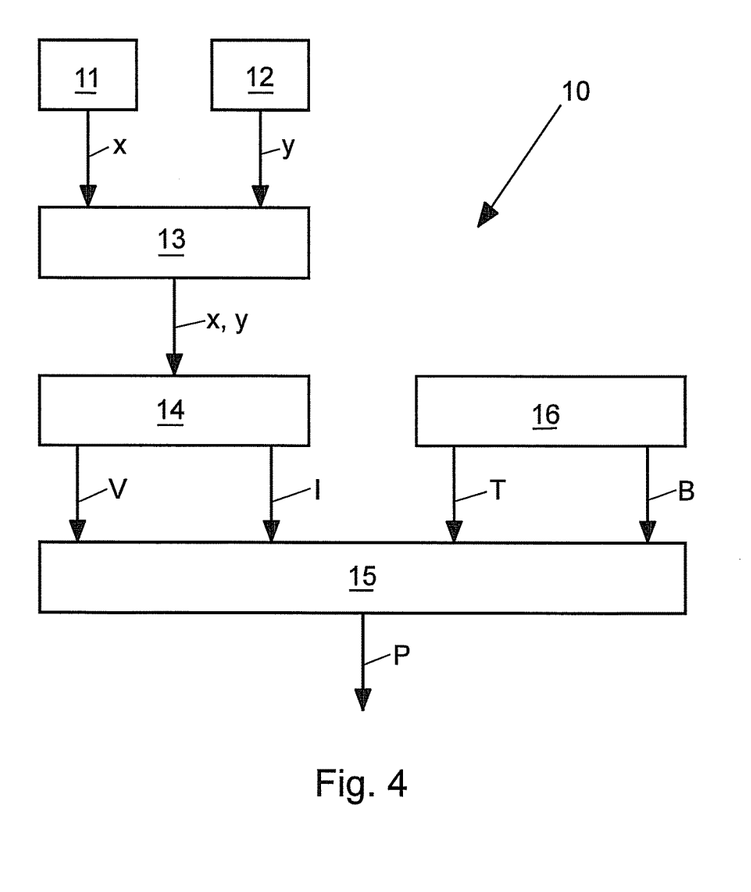
FIG. 4 is a schematic block diagram of a first embodiment of a device for providing a pilot warning signal.

FIG. 4 is a schematic block diagram of a first embodiment of a device 10 for providing a pilot warning signal P.

The device 10 comprises a first apparatus 11, a second apparatus 12, a third apparatus 13, a fourth apparatus 14, a fifth apparatus 15 and a sixth apparatus 16.

The first apparatus 11 is set up to provide a first signal x to indicate a pedal angle of a pedal which can be actuated by the pilot.

Further, the second apparatus 12 is set up to provide a second signal y which is directly dynamically dependent on the pedal angle.

Further, the third apparatus 13 is configured to form, in each case, a pair of values x, y from the first signal x and the second signal y at a specific time k.

The fourth apparatus 14 is set up to determine, in each case, an angle change V of the pairs of values x, y and an angle change I of the increment of the pairs of values x, y at two successive times k−1, k.

Further, the fifth apparatus 15 is set up to generate the pilot warning signal P when an actuation B of the pedal and a stimulated tumbling movement T of the aircraft are ascertained and if the determined angle change V of the pairs of values x, y is greater than a first threshold value TH1 of the determined angle change I of the increment of the pairs of values x, y is greater than a second threshold value TH2.

Further, the sixth apparatus 16 of FIG. 4 is set up to provide signals B and T.

In particular, the phase angle change is calculated from the increments, formed at two successive times k−1, k, of the pair of values x, y.

For example, the first threshold value TH1 and the second threshold value ZH2 are equal. In particular, the first threshold value TH1 and the second threshold value TH2 are zero.

Figure 5:
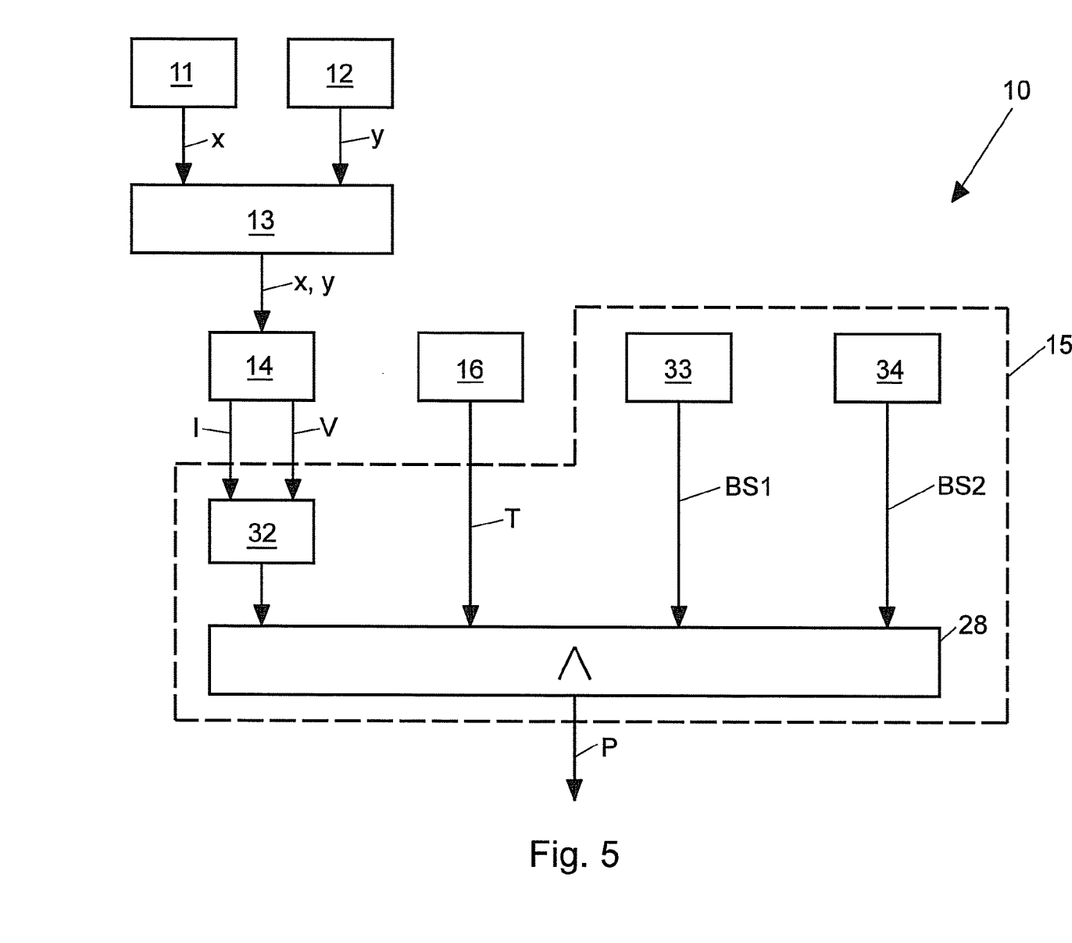
FIG. 5 is a schematic block diagram of a second embodiment of a device for providing a pilot warning signal.

FIG. 5 is a schematic block diagram of a second embodiment of a device 10 for providing a pilot warning signal P. The second embodiment of the device 10 according to FIG. 5 differs from the first embodiment of the device 10 according to FIG. 4 in the configuration of the fifth apparatus 15.

For this reason, to avoid repetition the first to fourth apparatuses 11-14 and the sixth apparatus 16 are not described in detail again.

In this case, the fifth apparatus 15 has an apparatus 32 which is set up to receive the angle change V of the pairs of values x, y and the angle change I of the increment of the pairs of values x, y on the input side and to provide, as a function thereof, a first logic tumbling movement signal TS1 on the output side. The apparatus 32 sets the first logic tumbling movement signal TS1 to a positive logic signal level if the angle change V is greater than the first threshold value TH1 or the angle change I of the increment of the pairs of values x, y is confirmed to be greater than the second threshold value TH2.

The fifth apparatus 15 further comprises an apparatus 33 for providing a first logic actuation signal BS1.

The apparatus 33 determines a first temporal derivative of the pedal angle of the provided first signal x to provide a pedal speed. The apparatus 33 further estimates a relevant actuation B of the pedal as a function of the provided first signal x and the determined first temporal derivative and provides, as a function thereof, the first logic actuation signal BS1.

The fifth apparatus 15 further has an apparatus 34 for providing a second logic actuation signal BS2. In the apparatus 34, a non-critical range for the pedal angle of the pedal which can be actuated by the pilot, an upper critical range above the non-critical range and a lower critical range below the non-critical range are defined. The apparatus 34 detects when the non-critical range is exceeded from the upper into the lower critical range or from the lower into the upper critical range and then sets the second logic actuation signal BS2 on the output side to a positive logic signal level if exceedance of this type is detected.

A positive signal level BS2 is reset to a non-positive signal level after a time TM if the transition critical→critical is not repeated.

The fifth apparatus 15 further has an AND gate 28 which performs a logical AND operation on the first tumbling movement signal TS1, the first logic actuation signal BS1 and the second logic actuation signal BS2 and sets the pilot warning signal P to a positive logic signal level on the output side if TS1, BS1 and BS2 each have a positive logic signal level.

A positive logic signal level, for example 2V, corresponds to a logic value of one. Similarly, a non-positive logic signal level, for example 0V, corresponds to a logic value of zero. Of course, a different definition is also conceivable.

Figure 6:
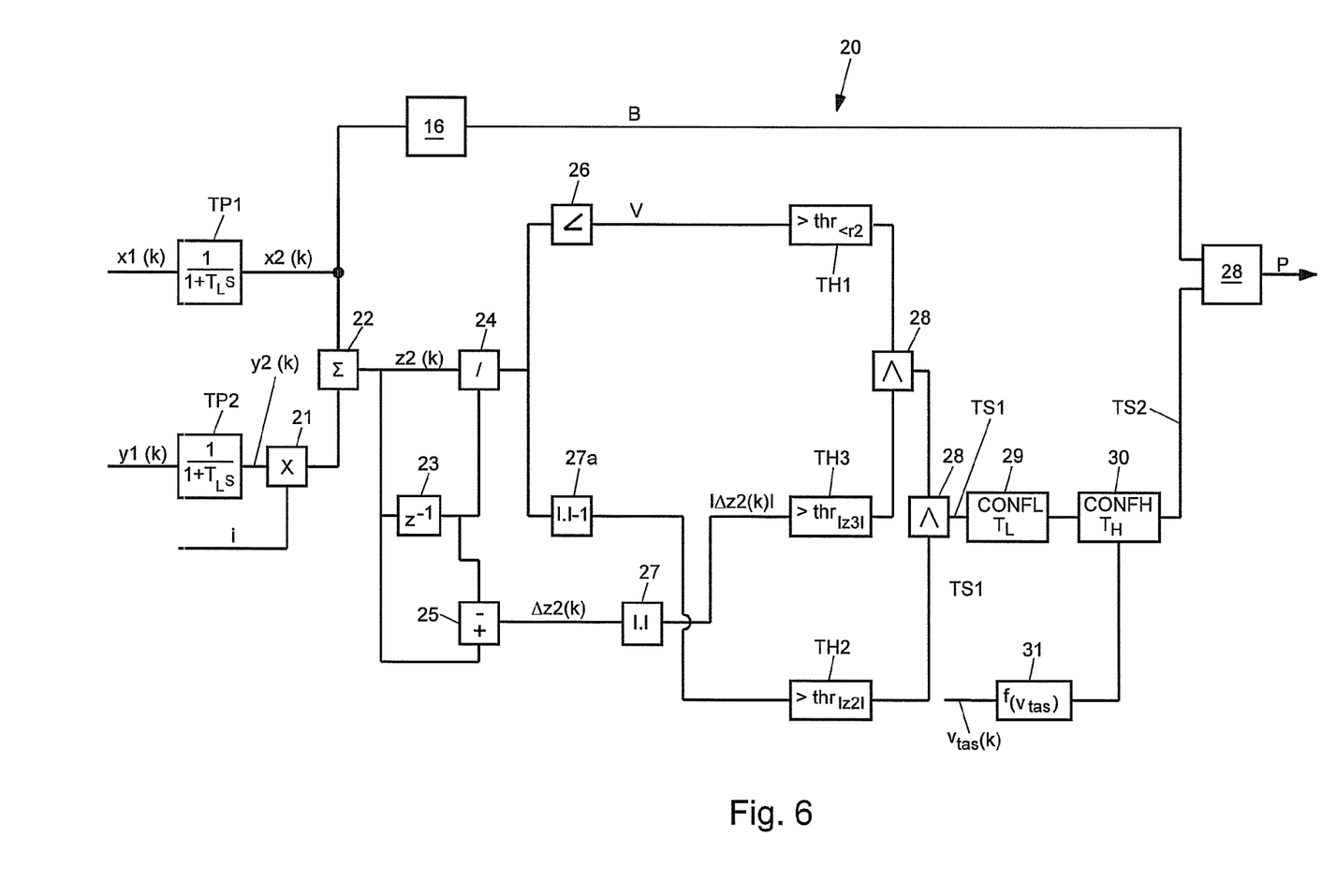
FIG. 6 is a schematic block diagram of a third embodiment of a device for providing a pilot warning signal.

FIG. 6 is a schematic block diagram of a third embodiment of a device 20 for providing a pilot warning signal P.

The third embodiment of the device 20 according to FIG. 6 is based on the two embodiments of the device 10 according to FIGS. 4 and 5.

Referring to FIG. 6, the following variables or reference numerals denote the following signals:

$x1(k)$ scaled first signal at time k
$x2(k)$ low-pass filtered, scaled first signal at time k
$y1(k)$ scaled second signal at time k
$y2(k)$ low-pass filtered, scaled second signal at time k
i imaginary number
$z2(k)$ complex number $z2(k)$; $z2(k)=x2(k)+i\cdot y2(k)$
$<z2(k)$ phase angle of the complex number $z2(k)$
$|z2(k)|$ value of the complex number $z2(k)$
$V<(z2(k)/z2(k-1))$ angle change in z2 in a time step $k-1 \rightarrow k$ The low-pass filter TP1 receives the scaled first signal $x1(k)$ on the input side and provides the low-pass filtered, scaled first signal $x2(k)$ on the output side.

Similarly, the low-pass filter TP2 low-pass filters the scaled second signal $y1(k)$ to provide the low-pass filtered, scaled second signal $y2(k)$.

The low-pass filtered, scaled second signal $y2(k)$ is further multiplied by the imaginary i of the multiplication means 21.

The multiplication means 21 multiplies the low-pass filtered, scaled second signal $y2(k)$ by i.

The addition means 22 adds up $x2(k)$ and $i\cdot y2(k)$ to form the complex number $z2(k)$.

The delay means 23 is capable of delaying the complex number $z2(k)$ by a time step between k and k−1. The division means 24 is capable of dividing the complex numbers $z2(k)/z2(k-1)$.

The apparatus 25 is capable of increment formation and thus of providing $\Delta z2(k)$.

An apparatus 26 is also provided for calculating the phase angle, which means provides, on the output side, the phase angle change $V=<(z2(k)/z2(k-1))$ of the complex number $z2(k)$ in time step $k+1 \rightarrow k$.

The respective apparatus 27 is capable of forming a value. The apparatus 27a is also capable of forming the value and subsequently decrementing the value by 1.

The apparatuses TH1-TH3 each output an output signal having a positive logic signal level if the input signal is greater than the respective threshold value TH1-TH3.

The respective apparatus 28 is capable of performing an AND operation on the input signals and provides a signal having a positive logic signal level on the output side if all the input signals have a positive logic signal level.

The output signal of the right-hand logical AND gate 28 in FIG. 6 corresponds to a first logic tumbling movement signal TS1 to indicate a tumbling movement of the aircraft. This is set to a positive logic signal level if the phase angle $<z2(k)$ of the complex number is greater than the first threshold value TH1, the value of the increment $|\Delta z2(k)|-1$ of the complex number is greater than the second threshold value TH2 and the absolute value $|z2(k)|$ of the complex number is greater than a third threshold value.

The apparatuses 29 and 30 are suitable as confirmation blocks for confirming a non-positive or positive signal level of the first tumbling movement signal TS1.

The intermediate signal TS1 is set to a non-positive signal level if the input signal TS1 has assumed such a signal level in the last period of length TL. The second logic tumbling movement signal TS2 is set to a positive value if the intermediate signal TS1a has assumed such a signal level in the last period of length TH.

For setting the second duration TH, an apparatus 31 is provided which calculates the second duration TH as a function of the calibrated aircraft speed $V_{tas(k)}$ (or as a function of other parameters characterising the instantaneous operating point of the aircraft).

Figure 7:
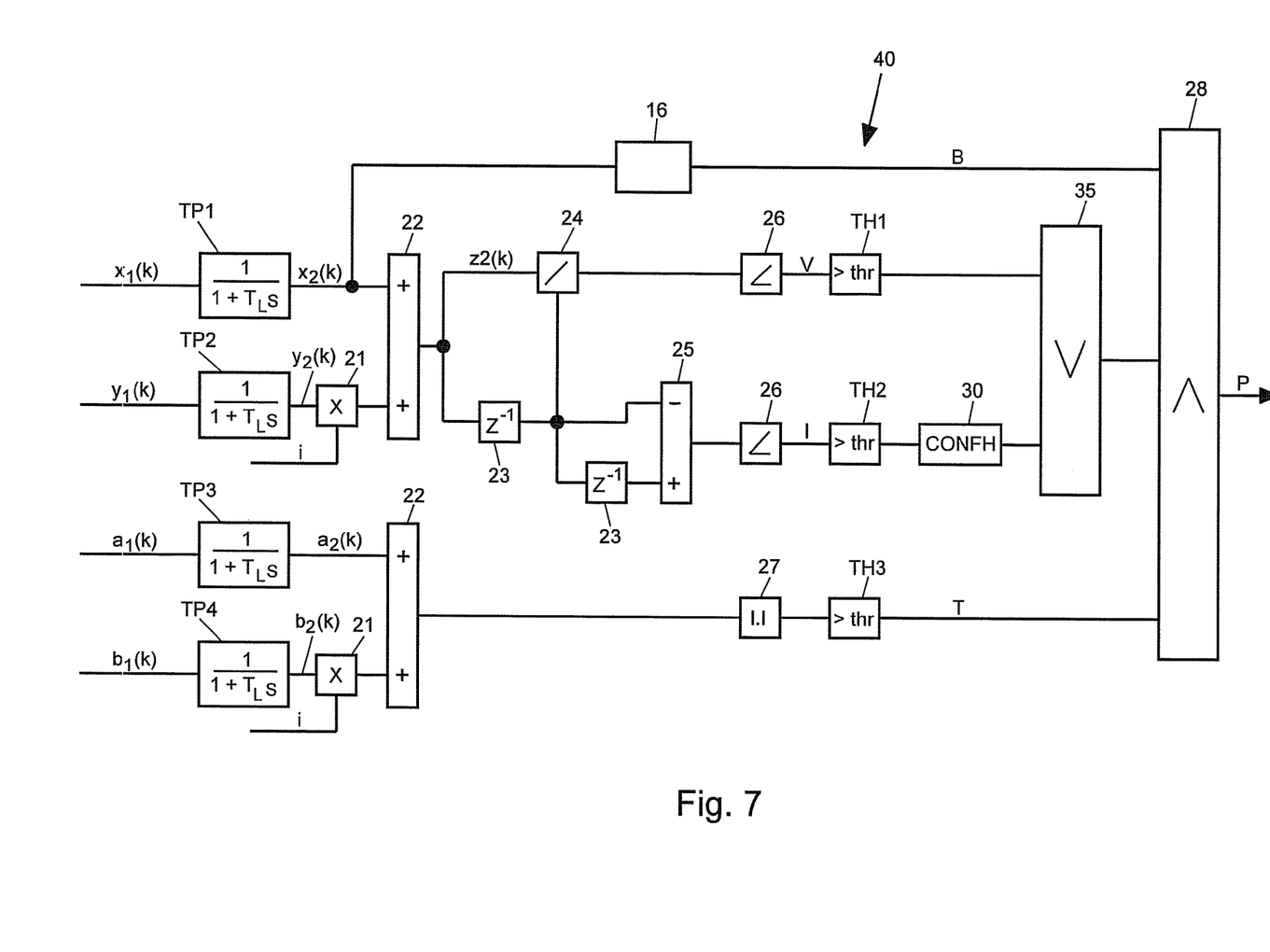
FIG. 7 is a schematic block diagram of a fourth embodiment of a device for providing a pilot warning signal.

FIG. 7 is a schematic block diagram of a fourth embodiment of an embodiment 40 for providing a pilot warning signal P.

The fourth embodiment of the device 40 according to FIG. 7 is based on the two embodiments of the device 10 according to FIGS. 4 and 5.

Referring to FIG. 7, the following variables or reference numerals denote the following signals:
DRM pedal angle
$DRM_{ref}$ non-critical reference value for the pedal angle;
$x1(k)$ scaled first signal at time k,
where $$x_1 = \frac{DRM}{DRM_{ref}}$$

$x2(k)$ low-pass filtered, scaled first signal
at time k
β sideslip angle of the aircraft
$β_{ref}$ non-critical reference angle of the sideslip angle β
$y1(k)$ scaled second signal at time k,
where $$y_1 = \frac{β}{β_{ref}}$$

$y2(k)$ low-pass filtered, scaled second signal
at time k
i imaginary number
$z2(k)$ complex number $z2(k)$; $z2(k)=x2(k)+i·y2(k)$
$<z2(k)$ phase angle of the complex number $z2(k)$
$|z2(k)|$ value of the complex number $z2(k)$ $$a_1(k) = \frac{r}{r_{ref}};$$

where r is the body yaw rate and $r_{ref}$ is a non-critical reference value for the yaw rate r. The reference value $r_{ref}$ can be predetermined in a fixed manner or can be adaptively adjusted as a function of predetermined aircraft parameters;
$a_2(k)$ low-pass filtered $a_1(k)$;

$$b_1(k) = \frac{p}{p_{ref}},$$

where p is the body roll rate and $p_{ref}$ is a non-critical reference value for the roll rate p. The reference value $p_{ref}$ can be predetermined in a fixed manner or can be adaptively adjusted as a function of predetermined aircraft parameters;
$V=<(z2(k)/z2(k-1))$ The AND gate 28 of the device 40 provides a pilot warning signal P when an actuation B of the pedal is ascertained, a stimulated tumbling movement T of the aircraft is ascertained, and if the determined angle change V is greater than a first threshold value TH1 or an angle change I of the increment of the pairs of values is greater than a second threshold value TH2 and this is additionally confirmed by confirmation means 30.

Although the present invention has been described herein with reference to preferred embodiments, it is not restricted thereto, but can be modified in many different ways.

LIST OF REFERENCE NUMERALS

10, 20, 40 device
11 first apparatus
12 second apparatus
13 third apparatus
14 fourth apparatus
15 fifth apparatus
16 sixth apparatus
21 multiplication means
22 addition means
23 delay means
24 division means
25 increment formation apparatus
26 phase angle calculation apparatus
27 absolute value formation apparatus
28 AND gate
29-34 apparatuses
35 OR gate
a body yaw rate
b body roll rate
x first signal
y second signal
k time
V ratio
I increment
B signal for ascertained actuation of the pedal
BS1 first logic actuation signal
BS2 second logic actuation signal
P pilot warning signal

The invention claimed is:
1. A method for providing a pilot warning signal for a pilot of an aircraft, the method comprising:
providing a first signal to indicate a pedal angle of a pedal which can be actuated by the pilot;
providing a second signal which is directly dynamically dependent on the pedal angle;
pairing up values of the first signal and the second signal at specific times;
determining an angle change of the pairs of values and an angle change of an increment of the pairs of values at two successive times (k−1, k); and
generating the pilot warning signal when actuation of the pedal and a stimulated tumbling movement of the aircraft are ascertained and if the determined angle change of the pairs of values is greater than a first threshold value or the determined angle change of the increment of the pairs of values is greater than a second threshold value.

2. The method according to claim 1, further comprising forming the second signal as a sideslip angle signal to indicate the sideslip angle of the aircraft, as a lateral load factor of the aircraft or as a negative rotation rate of the aircraft about a vertical axis of the aircraft.

3. The method according to claim 2, wherein the second signal is formed as a reconstructed sideslip angle signal of the aircraft.

4. The method according to claim 1, wherein ascertaining the actuation of the pedal to avoid false alarms comprises:

determining a first temporal derivative of the pedal angle of the provided first signal to provide a pedal speed; and estimating a relevant actuation of the pedal as a function of the provided first signal and the determined first temporal derivative to provide a first logic actuation signal.

5. The method according to claim 4, wherein ascertaining the actuation of the pedal to avoid false alarms comprises:

providing a non-critical range for the pedal angle of the pedal which can be actuated by the pilot;

determining an upper critical range above an admissible range;

determining a lower critical range below the non-critical range;

detecting when the non-critical range is exceeded from the upper critical range into the lower critical range or from the lower critical range into the upper critical range; and setting a second logic actuation signal to a positive logic signal level when exceedance is detected.

6. The method according to claim 5, further comprising generating the pilot warning signal if the first and second logic actuation signals are set to a logic signal level and if a determined ratio is greater than the first threshold value or the increment formed is greater than the second threshold value.

7. The method according to claim 1, further comprising:

providing the first signal by a measurement of the pedal angle; or calculating the first signal as a function of a measured rudder deflection or as a function of the measured rudder deflection and a yaw damping signal.

8. The method according to claim 5, further comprising:

sampling at specific times, scaling and filtering the first signal and the second signal to obtain a sampled first signal and a sampled second signal;

mapping the pairs of values from the sampled first signal and the sampled second signal as a complex number with the first signal as a real part and the second signal as an imaginary part;

mapping a ratio of relative changes in the first signal and the second signal of two pairs of values at two successive times as a change in a phase angle of the complex number.

9. The method according to claim 8, further comprising:

setting a first logic tumbling movement signal to a positive logic signal level to indicate a tumbling movement of the aircraft if the phase angle of the complex number is greater than the first threshold value, the value of the increment minus one of the complex number is greater than the second threshold value and an absolute value of a change in the complex number is greater than a third threshold value; and/or setting a second logic tumbling movement signal to a positive logic signal level to indicate a tumbling movement of the aircraft if the first logic tumbling movement signal has been set to the positive logic signal level for a first predetermined duration, and resetting the second logic tumbling movement signal to a negative logic signal level if the first logic tumbling movement signal has been set to the positive logic signal level for a second predetermined duration.

10. The method according to claim 9, further comprising:

generating the pilot warning signal if the first logic tumbling movement signal is set to the positive logic signal level and if the first and the second logic actuation signals are set to a logic signal level; and/or generating the pilot warning signal if the second logic tumbling movement signal is set to the positive logic signal level and if the first and the second logic actuation signals are set to the logic signal level.

11. A non-transitory computer-readable medium carrying a computer program product which causes a method for providing a pilot warning signal for a pilot of an aircraft to be carried out on a program-controlled apparatus, the method comprising:

providing a first signal to indicate a pedal angle of a pedal which can be actuated by the pilot;

providing a second signal which is directly dynamically dependent on the pedal angle;

pairing up values of the first signal and the second signal at specific times;

determining an angle change of the pairs of values and an angle change of an increment of the pairs of values at two successive times (k−1, k); and generating the pilot warning signal when actuation of the pedal and a stimulated tumbling movement of the aircraft are ascertained and if the determined angle change of the pairs of values is greater than a first threshold value or the determined angle change of the increment of the pairs of values is greater than a second threshold value.

12. A warning device for providing a pilot warning signal intended for a pilot of an aircraft using a method for providing the pilot warning signal for the pilot of the aircraft, the warning device comprising:

a first apparatus which is set up to provide a first signal which contains information about a pedal angle of a pedal which can be actuated by the pilot;

a second apparatus which is set up to provide a second signal which is directly dynamically dependent on the pedal angle;

a third apparatus which is set up to pair up values of the first and second signals at specific times;

a fourth apparatus which is set up to determine an angle change of the pairs of values and an angle change of an increment of the pairs of values at two successive times; and a fifth apparatus which is set up to generate the pilot warning signal when actuation of the pedal and a stimulated tumbling movement of the aircraft are ascertained and if the predetermined angle change of the pairs of values is greater than a first threshold value or the predetermined angle change of the increment of the pairs of values is greater than a second threshold value, the method for providing the pilot warning signal for the pilot of the aircraft comprising:

providing the first signal to indicate the pedal angle of the pedal which can be actuated by the pilot;

providing the second signal which is directly dynamically dependent on the pedal angle;

pairing up values of the first signal and the second signal at specific times;

determining the angle change of the pairs of values and the angle change of the increment of the pairs of values at two successive times (k−1, k); and generating the pilot warning signal when actuation of the pedal and the stimulated tumbling movement of the aircraft are ascertained and if the determined angle change of the pairs of values is greater than the first threshold value or the determined angle change of the increment of the pairs of values is greater than the second threshold value.

13. The warning device according to claim 12, wherein the first apparatus comprises a potentiometric, inductive, capacitive and/or optical angle sensor and/or linear converter which produces the first signal from a measured differential angle or differential path of the pedal.

14. The warning device according to claim 12, wherein the second apparatus comprises a measuring apparatus which detects a negative rotation rate of the aircraft about a vertical axis thereof by direct measurement and derives the second signal from the negative rotation rate.

15. The warning device according to claim 12, wherein the fifth apparatus comprises:
- an optical warning apparatus, which contains a signal light and/or a monitor; and/or
- an acoustic warning apparatus, which contains a loudspeaker; and/or
- a haptic warning apparatus, which contains a device for producing a vibration.

16. The warning device according to claim 12, wherein a microcontroller or microprocessor is provided which contains at least one of the first to fifth apparatuses.

17. The warning device according to claim 16, wherein the microcontroller or microprocessor is set up to calculate the first signal from a detected rudder angle and/or detected yaw damping and/or to determine the second signal by arithmetic using complex numbers or by a polar curve.

18. The warning device according to claim 16, wherein the microcontroller or microprocessor is set up to pair up the values and/or wherein a memory is provided in which at least one pair of values at a first time and at least one increment of the pair of values at the first time can be stored, and wherein the microcontroller or microprocessor is set up to determine the angle change from the pair of values at the first time and the pair of values at a second time and to determine the angle change of the increment from the increment of the pair of values at the first time and the increment of the pair of values at the second time.

* * * * *